United States Patent
Wilf et al.

(10) Patent No.: US 6,937,766 B1
(45) Date of Patent: Aug. 30, 2005

(54) METHOD OF INDEXING AND SEARCHING IMAGES OF TEXT IN VIDEO

(75) Inventors: Itzhak Wilf, Neve Monoson (IL); Joseph Ladkani, Jerusalem (IL); Ovadya Menadeva, Modin (IL); Hayit Greenspan, Kfar Bilu (IL)

(73) Assignee: MATE—Media Access Technologies Ltd., Savyon (IL)

( * ) Notice: Subject to any disclaimer, the term of this patent is extended or adjusted under 35 U.S.C. 154(b) by 0 days.

(21) Appl. No.: 09/549,229

(22) Filed: Apr. 13, 2000

Related U.S. Application Data

(60) Provisional application No. 60/129,360, filed on Apr. 15, 1999.

(51) Int. Cl.[7] ............................. G06K 9/72; G06G 5/00; H04N 7/00
(52) U.S. Cl. ...................... 382/229; 345/723; 348/468
(58) Field of Search ..................... 707/3, 104.1, 516, 707/529, 530, 526; 345/723, 724; 382/229; 348/468

(56) References Cited

U.S. PATENT DOCUMENTS

| | | | | |
|---|---|---|---|---|
| 5,703,655 A | * | 12/1997 | Corey et al. ............... | 348/468 |
| 5,950,207 A | * | 9/1999 | Mortimore et al. ......... | 707/104.1 |
| 6,243,713 B1 | * | 6/2001 | Nelson et al. ............. | 707/104.1 |
| 6,462,754 B1 | * | 10/2002 | Chakraborty et al. ....... | 345/723 |

OTHER PUBLICATIONS

Jain and B. Yu, "Automatic text Location in Images and Video Frames", TR.

* cited by examiner

*Primary Examiner*—Amelia M. Au
*Assistant Examiner*—Brian Le
(74) *Attorney, Agent, or Firm*—Eitan, Pearl, Latzer & Cohen Zedek, LLP

(57) ABSTRACT

A method for generating an index of the text of a video image sequence is provided. The method includes the steps of determining the image text objects in each of a plurality of frames of the video image sequence; comparing the image text objects in each of the plurality of frames of the video image sequence to obtain a record of frame sequences having matching image text objects; extracting the content for each of the similar image text objects in text string format; and storing the text string for each image text object as a video text object in a retrievable medium.

9 Claims, 17 Drawing Sheets

131
132
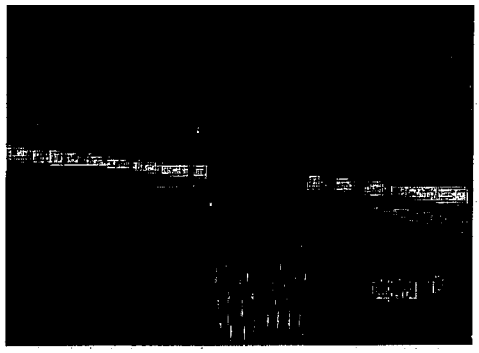
133
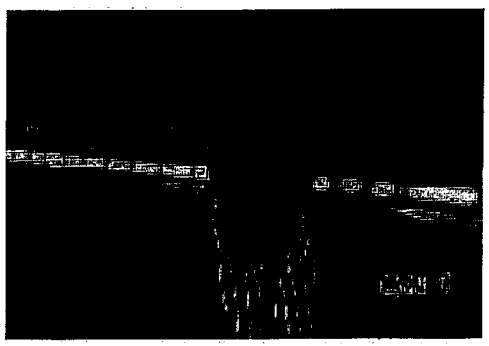
134
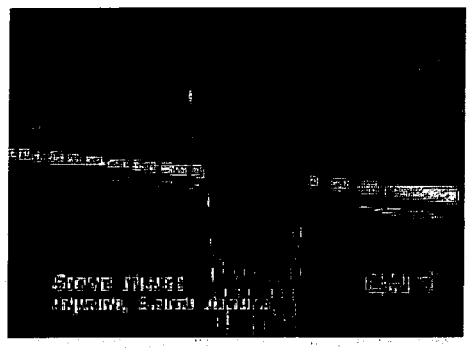
135
136
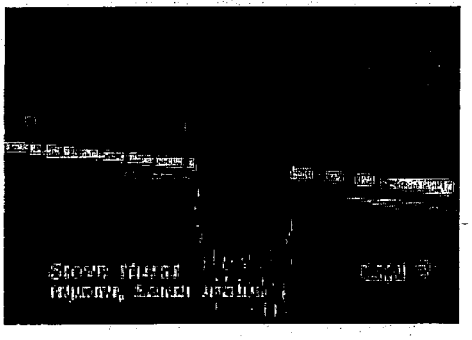
137
137
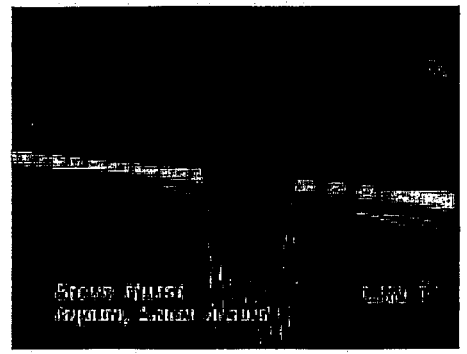
Fig. 1B – Prior Art

```
Mark all current frame text objects as unmatched.
Mark all previous frame text objects as unmatched.
Sort all current frame text objects by string length.
For each text object k in current frame:
        Set the matched text object Mk to NULL
        And the similarity score Sk to zero:
        For each unmatched text object l in previous frame:
                Compute the similarity score S(k,l)
                between the text objects.
                If S(k,l) > Sk:
                        Sk = S(k,l)
                        Mk = l
                End
        End
End
```

FIG. 12

Detect image text.
Create video text objects.
Mask out all detected text regions.
In remaining image areas, identify one or more dominant motions.
For each detected video text object:
    Try to align object motion with one of the dominant motions.
In case of success, declare video text object as in-scene text.

FIG. 14

Initialize the edit cost for all symbols of the query to a large value.
For all text strings in the video text objects do:
    Compute the edit sequence of minimum cost from the query to the text string.
    For each symbol in the query do:
        Set the edit cost to the smallest of the current edit cost and the edit cost associated with the edit operation with respect to the text string.
    End
End
Compute the sum of edit cost values for all symbols of the query.

FIG 15

Load brand name definition data [text, (color), minimum size, and minimum visibility]

Reset brand name exposure time

For each video text object:

For each brand name:
        For each time sample in video text object data:
                Match video text object text data with brand name text data.
                If match score above threshold AND
                Size above minimum size AND
                Visibility above minimum visibility, then
                      Add time sample to brand name exposure time
                END
        END
    END
END

FIG. 18

METHOD OF INDEXING AND SEARCHING IMAGES OF TEXT IN VIDEO

This application claims benefit of Provisional Application No. 60/129,360 filed Apr. 15, 1999.

FIELD OF THE INVENTION

The present invention relates to video text indexing. More particularly, the invention relates to a method for detecting images of text as part of the video content.

BACKGROUND OF THE INVENTION

The amount of video data stored in multimedia and other archives grow very rapidly which makes searching a time consuming task. Text is an important component in video data conveying a major portion of its information. In several to types of programming, such as sports and news, graphic overlays which include text and symbols (e.g., logos) are superimposed on the video picture content. Such superimposing is generally done by video character generators such as manufactured by Chyron Corporation of 5 Hub Drive, Melville, N.Y. 11747. The text is known as "overlayed text". For example, in broadcasting, the overlay of "Breaking News" is superimposed by the producer over the main display.

The text information may also be present as part of the picture content, which we will term "in-scene text". An example for text that is present as part of the scene are road-signs, billboards with visual text information, ad campaign titles on players shirts in the field etc. The in-scene text information is captured by the camera as it is filming the scene.

Additional characteristics of text information in video, are "static text", in which case the text information is static with respect to the picture information, and "scrolling text", in which case the text is scrolling on the screen with a rate that is independent of camera motion or object motion In the scene.

While the graphic overlays are generally displayed at a constant image location and exhibit only temporal variations, (namely appearance and disappearance), in other cases the overlay may be moving (e.g. scrolling). The term "text" is used in the present application to indicate "static text", and "scrolling text" refers to a specific separate scenario.

Reference is now made to FIGS. 1A and 1B, which illustrate four examples of video text information, as follows:

overlayed text examples of FIG. 1A (static and scrolling, left to right, respectively). The static is shown in picture 134 and the scrolling left to right is shown in pictures 135 and 136 respectively of FIG. 1B.

In-scene text examples (bottom row of FIG. 1A), with two scenarios depicted. In one example, the text is on the main moving object in the scene (picture bottom left 137), and in the second example, the text is part of the background (picture bottom right 138/139).

Two classes of applications for text localization are known, as follows:

document conversion; and searching purposes (such as Web searching) and image and video indexing purposes.

The first class of applications (document conversion) mostly involves binary images and requires a very high accuracy in locating all the text in the input image. This necessitates a high image resolution.

On the other hand, the most important requirements for the second class of applications is a high speed for the localization and content extraction, with only the most important text in the image or frame required to be extracted. For example, only font size above a certain threshold may be of interest.

Automatic text location without character recognition capabilities refers to locating regions, which only contain text without a prior need to recognize characters in the text. Two primary methods are used for locating text:

i).The first method regards text as textured objects and uses well-known methods of texture analysis, such as Gabor filtering and spatial variance to automatically locate text regions.

ii) The second method of text location uses connected component analysis. This method is very fast and achieves high localization accuracy. It has mainly been used in binary images and has recently been extended to multi-valued images, such as color documents and video frames.

FIG. 2 illustrates an example of the latter method. The input image is decomposed into multiple foreground images. Each segmented image passes a connected component module and a text identification module, These modules may be implemented in parallel. The outputs from all channels are composed together to identify locations of text in the input image. Text location is represented as the coordinates of its bounding box.

In dealing with multi-valued images, the image is decomposed into a set of "real foreground" images and a "background-complementary foreground image". A binary image has two element images, the given image and its inverse, each being a real foreground image. In pseudo colored images, real foreground images are extracted via histogramming the pixel values and retaining those foreground images in which the number of pixels is greater than a given threshold. The color with the largest number of pixels is regarded as the background, from which the background-complementary foreground images can be generated.

For color images and video frames, color quantization schemes or clustering may be used, as known in the art to generate a small number of meaningful color prototypes. Once a set of color prototypes is extracted, a similar method as for pseudo-color images can be used to produce real foreground and background-complementary foreground images for the color-quantized images.

After the decomposition of the multi-valued image, a look up table is obtained associating pixel values to foreground images. Each pixel in the input images may contribute to one or more foreground images specified by the table.

It is known to generate connected components on each now-binary masked image per foreground image, as described by Jain and B. Yu, in "Automatic text Location in Images and Video Frames", TR. A connected component algorithm may be implemented in parallel for all foreground images. If we assume that most of the important text content is horizontally positioned in the frame, clustering of the connected components in the horizontal direction is pursued resulting in candidate text lines.

A verification module in the system determines whether candidate text lines contain text or non-text based on statistical feature of connected components. For separated characters, their corresponding connected component should be well aligned. The number of connected components should be in proportion to the length of the text line. For characters touching each other, features can be extracted based on the projection profiles of the text line in both the horizontal and vertical directions.

Connected component analysis and text Identification modules are applied to individual foreground images. Text lines extracted from different foreground images may be overlapping and therefore, need to be merged. Heuristic rules may be used in merging the information into a final set of bounding boxes localizing the text in the individual frame.

Examples of the text localization stage are illustrated in FIG. 3, to which reference is now made. FIG. 3a shows examples of foreground images extracted from a given input image. FIG. 3b exemplifies a connected component scenario and the generation of candidate text line and FIG. 3c demonstrates the use of projections in the verification stage and the string formation stage, binarization procedure.

FIG. 4 is a schematic block diagram illustration of the detection-binarzation-OCR process for a single frame image.

Optical character recognition is well known in prior art. Generally recognition is done on text images that are bi-level (black or white). OCR engines are commercially available, such as for example, an OCR engine available from Caere Corp., 100 Cooper Court, Los Gatos, Calif. 95032 USA.

The clarity of the text in the frame being analyzed is a sensitive and critical point. The accuracy of text detection (as well as the binarization process and the OCR) is dependent on issues such as contrast and occlusions. Such is the case that if the color of the text string is white, for example, and it is overlayed on a brightly colored shirt in the scene, the recognition of the words may only be partly successful. If the text string is partly occluded, such as the case when a person is walking in front of the street sign and only part of the sign is visible, again the recognition accuracy will be greatly diminished.

In a single frame we may get unclear text, as in the above examples, as well as lighting conditions. It may be the case that in a single frame only partial information is present. Such is the case for "in-scene text" when there is camera motion, and for "overlayed text" when there is scrolling of the text on the screen. In the scrolling scenario, only partial words and partial sentences may be obtained in the single frame scenario.

When utilizing a frame-by-frame system, it may be possible to increase the accuracy of the results (per issues mentioned above) by combining results from each frame analysis. This involves much redundancy in the amount of work needed to analyze each frame independently, since though it increases the search time, as information per each frame will be preserved it will still not enable the option of querying temporal content to be exercised.

A further disadvantage of the prior art is the categorization of the text into in-scene vs. overlayed text, static vs. scrolling is not possible in a single frame by frame analysis scenario.

A possible application for frame-by-frame video text indexing is in monitoring exposure of brand names. Companies put their name on billboards and other objects in events of high television exposure such as sports events. These companies want to know the actual level and quality of exposure of their brand name to the audience. This data can be later matched with audience metering data to reflect the actual commercial value of the brand name exposure. While in overlaid text the quality of the presentation is controlled, in the latter example, that quality is governed by the motion of the camera, which generally tracks the action in the scene. On such occasions the exposure of brand name is uncontrolled. What is needed is a method to index text in video, comparing said indexing data with a list of brand name to derive brand name exposure data.

Prior art teaches how to detect billboards which contain a known pattern or image and track them over time. A disadvantage of the known art is that it cannot derive indexing data in the case that the same brand name appears in many sizes and color, none of which is known to the system beforehand.

Furthermore, existing techniques have several disadvantages including that for text detection, binarization and recognition in single frame scenarios lose the temporal information that is a vital component of the video sequence, in that they lose accuracy in the recognition. In addition, the existing systems lose the temporal coding information regarding the string initialization and end points and lose the ability to categorize the text strings into selected categories.

SUMMARY OF THE INVENTION

An object of the present invention is to provide methods for video text indexing which overcome the disadvantages of existing methods in one or more of the above respects.

Another object of the present invention is to provide methods for representing the text content of a video sequence by a text index database, to enable the user to browse and search the extracted test representation instead of the original content, thus reducing online storage requirements as well as searching time.

Other objects of the invention are to avoid the above-described shortcomings of the prior art methods by utilizing the temporal content of the video sequence to produce a compact and concise video text information representation so as to produce a compact video text index database.

Another object of the invention is to compare a list of brand names with video indexing data to generate reports of brand-name exposure in video.

The text can be overlaid text or in-scene text, and the present invention teaches automatic categorization into these two families. The overlaid text can be static or moving, e.g. scrolling, zooming, etc. The video text index includes text string data, with recognized letters and words, the start time of the text image (or a portion of it) first appearance and the end time-code for the text image (or a portion of it) last appearance. Additionally the video text index includes frame location data in the form of image coordinates. In the case of a moving text: either a scrolling graphics overlay or in-scene text which moves due to camera or object motion: trajectory data either as a list of positions over time or a model of the motion. These data and additionally text attribute data and text categorization are used to facilitate a concise representation of the sequence and enable later automatic searching.

According to one aspect of the present invention, there is provided a method generating an index of the text of a video image sequence. The method includes the steps of:

determining the image text objects in each of a plurality of frames of the video image sequence;

comparing the image text objects in each of the plurality of frames of the video image sequence to obtain a record of frame sequences having matching image text objects;

extracting the content for each of the similar image text objects in text string format; and storing the text string for each image text object as a video text object in a retrievable medium.

Furthermore in accordance with a preferred embodiment of the present invention, the step of extracting includes the step of:

extracting the characteristics of the text string, the characteristics including at least one of a group consisting of spatial and temporal characteristics.

In addition, in accordance with a preferred embodiment of the present invention, the method includes the step of categorizing the text string as at least one of a group including static text, scrolling text, overlayed text and in-scene text.

Furthermore in accordance with a preferred embodiment of the present invention, the step of categorizing includes the steps of:

tracking the text string motion, or lack of it, over time;

tracking the image background motion or lack of it, over time; and comparing the text string motion and the background motion In addition, in accordance with a preferred embodiment of the present invention, the method includes the step of storing the frame location of the text string for each image text object as a video text object in a retrievable medium.

Furthermore, in accordance with a preferred embodiment of the present invention, the step of determining the-image text objects includes the steps of: selecting a consecutive pair of frames consisting of a first current frame and its previous frame;

a. selecting an image text object in the current frame;
b. comparing the selected image text object with each image text object of the previous frame;
c. repeating steps b) and c) for each image text object in the current frame;
d. selecting a subsequent consecutive pair of frames consisting of a second current frame and the previous frame of the second current frame, wherein the previous frame of the second current frame is the first current frame; and
e. repeating steps b)–e) for each consecutive pair of frames of a video sequence.

Furthermore, in accordance with a preferred embodiment of the present invention, the step of determining further includes the steps of:

quantizing the color space of each of the plurality of frames to a pre-determined number of individual colors;

forming a map of connected pixels for each of the pre-determined number of individual colors;

determining which of the connected pixels are potentially alpha-numeric characters;

grouping the potentially alpha-numeric characters as potential text string candidates, each of the potential text strings having a single text color.

forming a binary image of the potential text strings; and computing horizontal and vertical projections of the binary image and conducting a profile analysis to whether the potential string has text shape characteristics.

Additionally, in accordance with a preferred embodiment of the present invention, the step of determining which of the connected pixels are potentially alpha-numeric characters includes the step of determining the dimensions, aspect ratio and fill factor for the color space.

Furthermore, in accordance with a preferred embodiment of the present invention, the step of grouping includes the step of grouping according to the location of the potentially alpha-numeric characters.

Furthermore, In accordance with a preferred embodiment of the present invention, the step of comparing the selected image text object includes any of the steps of:

comparing the text content of the text objects;

comparing the location of the text objects; or computing a score characteristic of the image similarity of the regions occupied by the text objects.

BRIEF DESCRIPTION OF THE DRAWINGS

FIGS. 1A and 1B illustrate four examples of prior art displaying video text information (overlayed text, in-scene text, static and scrolling);

FIG. 12 is a detailed description of the text object matching and track formation module of FIG. 5.

FIG. 14 is a schematic illustration of the motion estimation module of FIG. 5;

FIG. 15 is a schematic illustration of the method of using motion information for text categorization;

FIG. 18 is a schematic illustration of the method for brand name exposure time accumulation.

DESCRIPTION OF PREFERRED EMBODIMENTS OF THE INVENTION

Figure 1A:
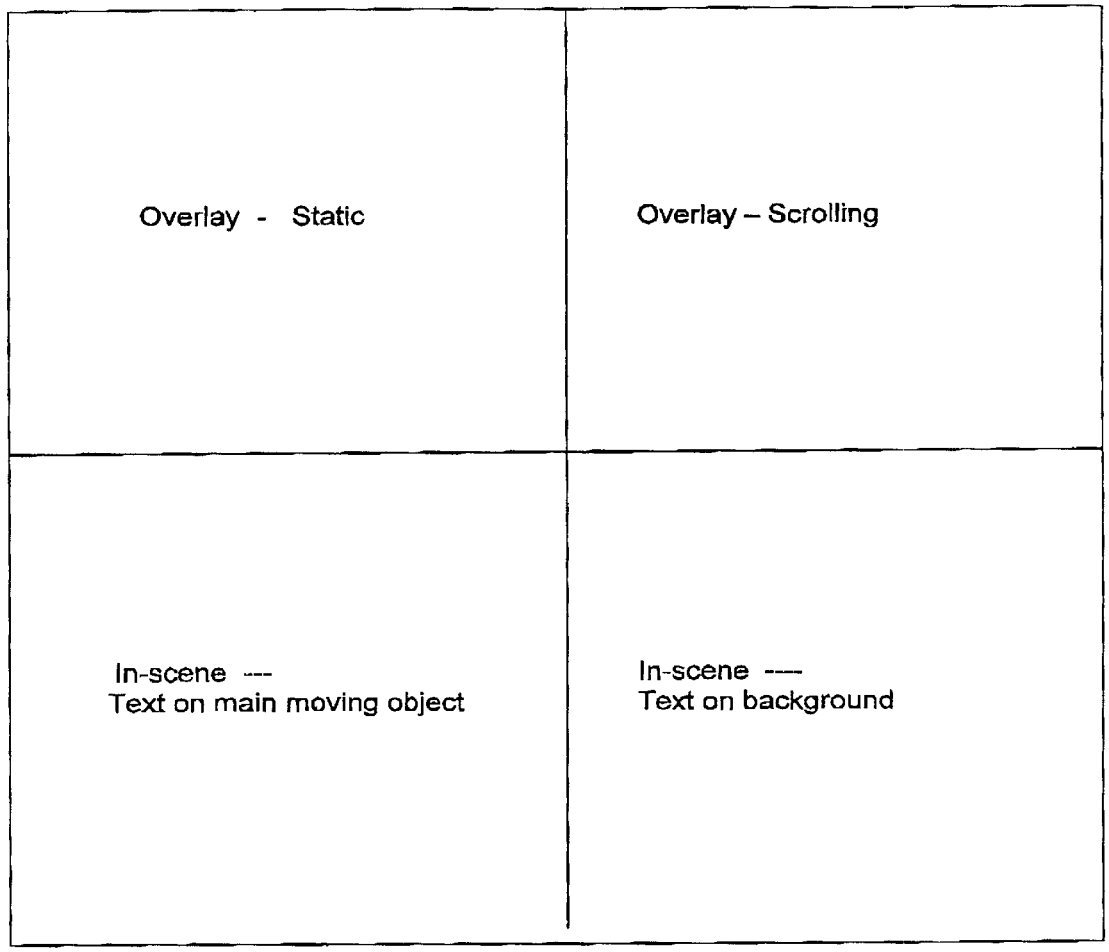
Figure 2:
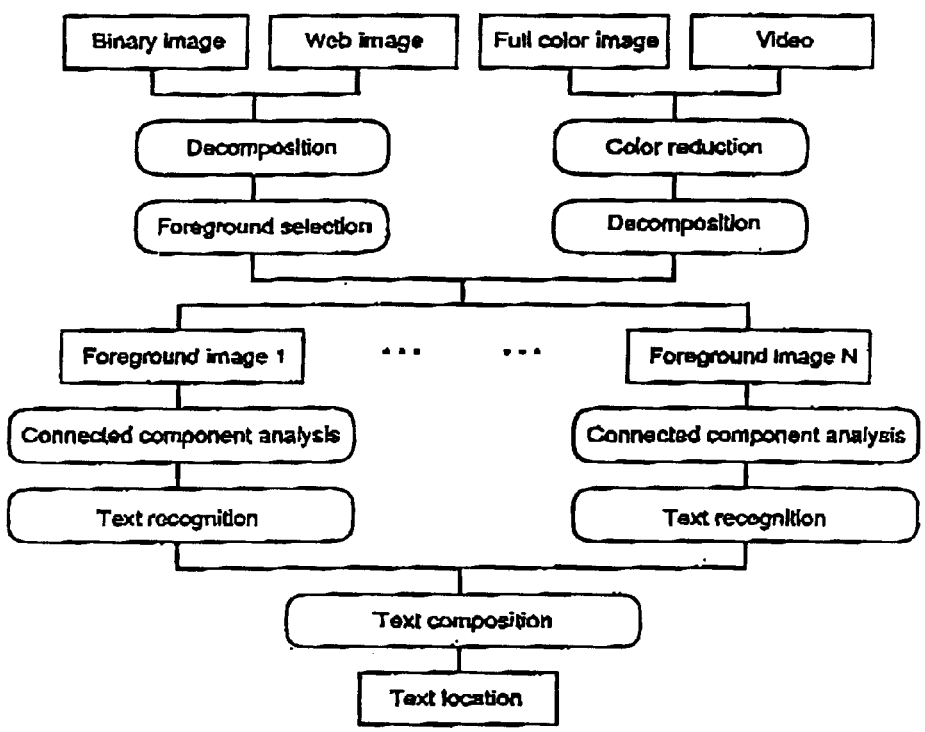
FIG. 2 is a flow chart of text localization schemes as known in prior art.
Figure 3:
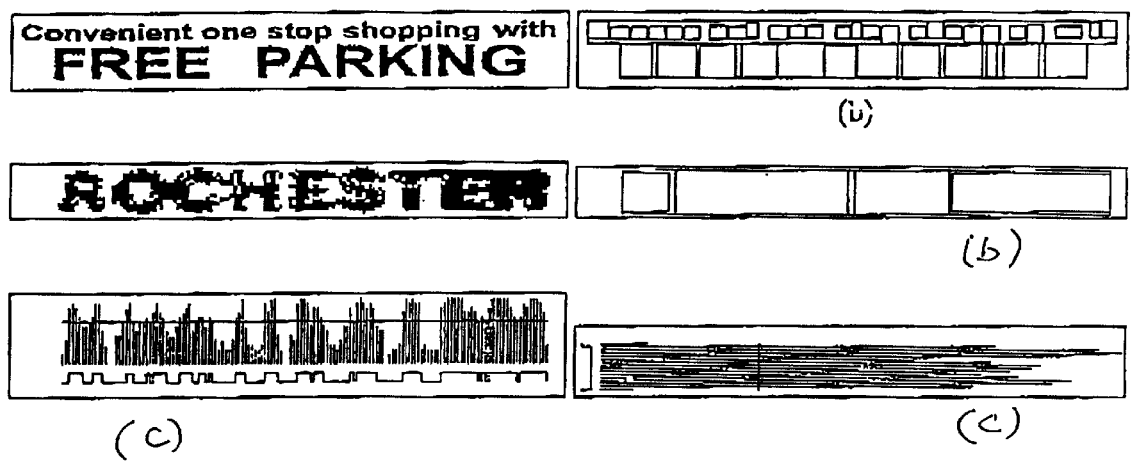
FIG. 3 is a more detailed schematic illustration of the text-localization scheme of FIG. 2.
Figure 4:
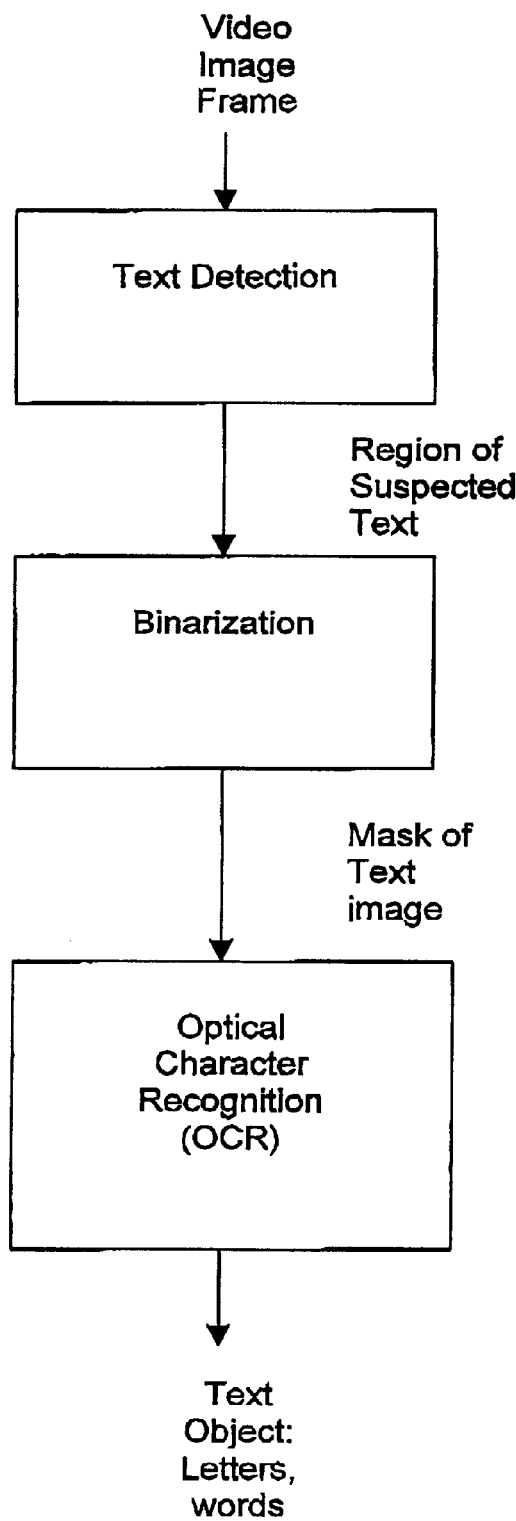
FIG. 4 is a schematic block diagram illustration of the detection-binarization-OCR process for a single frame image.
Figure 5:
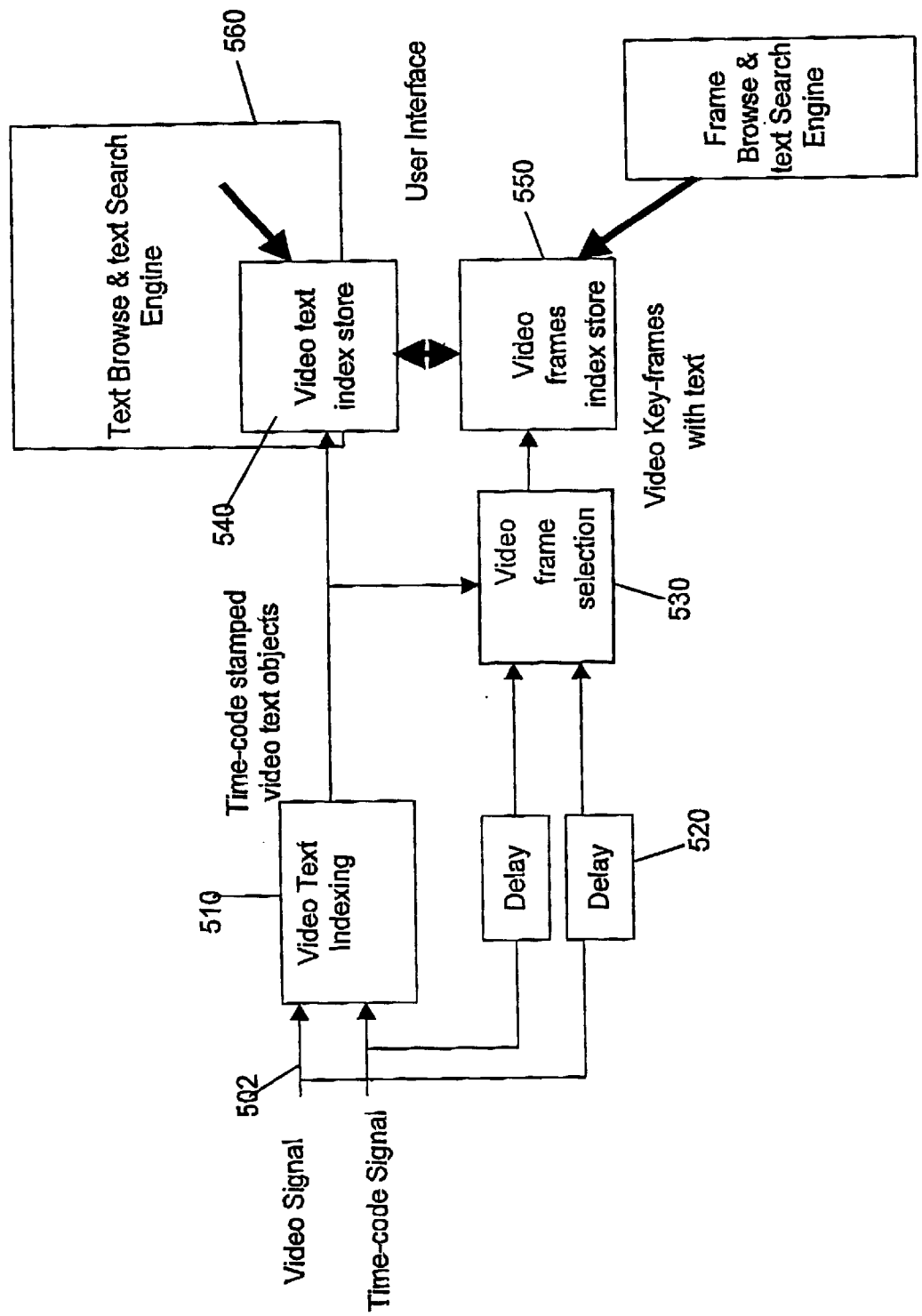
FIG. 5 is a schematic block diagram illustration of the system for video browsing and searching based on a video text indexing module, in accordance with a preferred embodiment of the present invention.

Reference is now made to FIG. 5, which is a schematic block diagram illustration of the system for video browsing and searching based on a video text indexing module, in accordance with a preferred embodiment of the present invention. The incoming video feed 502 is analyzed for text content automatically in the Video Text Indexing module 510. The Video Text Indexing module 510 includes an automatic text detection stage, as well as text information extraction. The output of this module is a set of video text objects, which are stored in the Video text index store 540.

Following the detection phase of the system (delay elements 520) the determination of text object locations is input to a Video frame selection module 530 from which the set of video frames in the input sequence, that contain text information can be indexed and stored in a Video frames (with text) index store 550.

A user interface module (560) allows for browsing and searching applications in either or both the extracted text index store and indexed frame store.

There are several browsing and searching applications for which automatic indexing of text data in video content is an enabling technology. In one video browsing application, the video frame sequence is represented by these frames which include text images (only showing the change of text content, or change of text content and image content). In a second video browsing application, the image text is used to browse the text. For example, dialogues present In a feature film as sub-titles are recognized and the viewer can browse the sub-title text as means to navigate the film content, In a third video searching application, users search video by the text content. For example, search video segments where the words "final lap" indicate an interesting segment in a sports program.

In searching for specific words inaccuracies in the recognized strings need to be accounted for. One possible implementation is the "agrep" program developed In the University of Arizona. This program is available also for download in source code form from: ftp://ftp.cs.arizona.edu/agrep/

In searching for content that is contained in the text information, the following factors are relevant:

f. the text string needs to be detected and recognized as a recognizable word or phrase;

g. the time codes or frame indices indicating the text appearing in the video sequence h. the text relative spatial location within the indicated frames needs to be extracted;

i. In addition, the characteristics of the text string may need to be extracted, thus treating text as a temporal object with representative attribute data. This may include the color of the string, the size, the font etc;

j. In addition, the categorization of the text string, as an "overlay text" or an "in-scene text", static or scrolling may be required.

The complete text information content Is termed "video text object".

A primary purpose of the present invention is to provide a method for extracting a list of Video Text Objects to serve as a representation of the text content in the original video image sequence for further browsing and searching. The Invention also provides as part of the Video Text Object database structure, information about text categorization for the purpose of enabling new user-interactive querying capabilities with the search time for text content greatly reduced.

Figure 6:
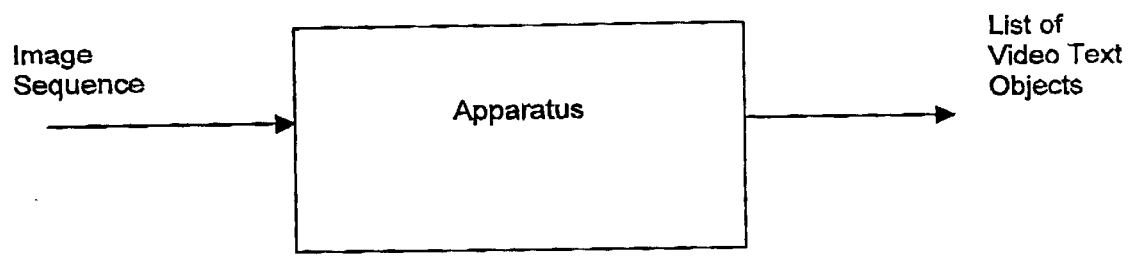
FIG. 6 illustrates the input and output of the video text indexing apparatus of FIG. 5.

Reference is now also made to FIG. 6, which shows the input and output of the proposed video text indexing apparatus 510, The Video image sequence 504 is input to the Video text indexing module 510 and the Video Text Object indexing data 506 is extracted as output.

Figure 7:
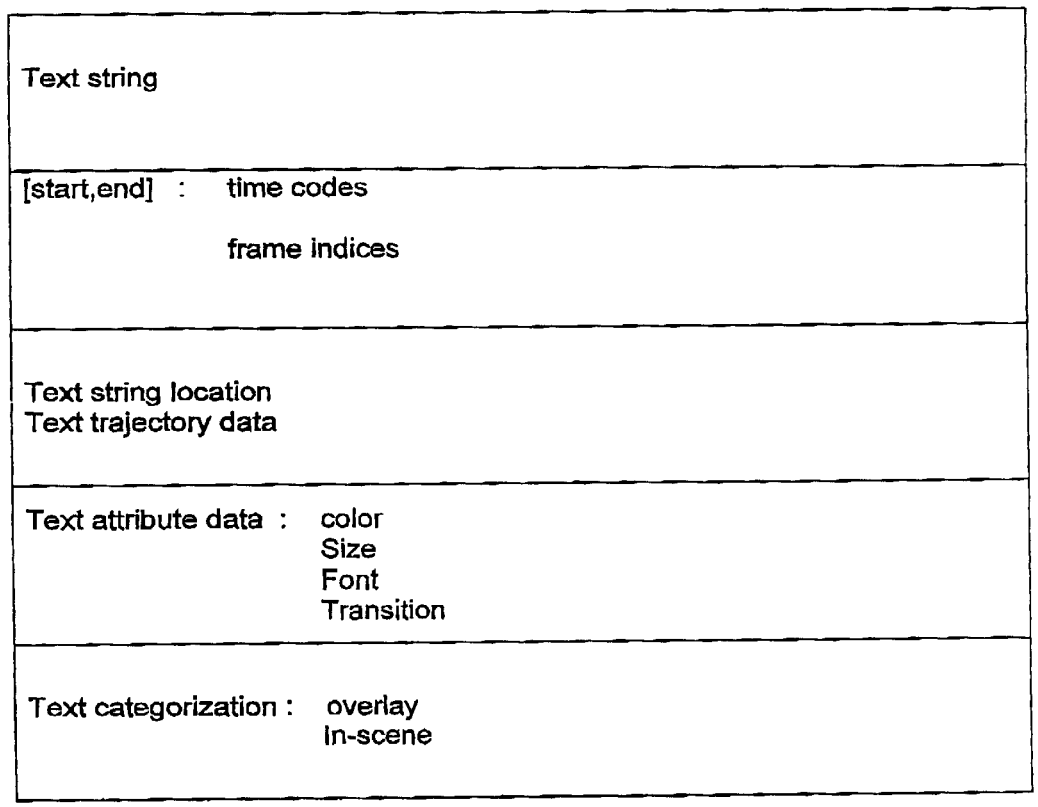
FIG. 7 shows the data structure defining the Video Text Object of the preset invention.

The Video Text Object 506 is defined by the data structure shown in FIG. 7, to which reference is now made.

The following definitions are used throughout the application:

Text = graphical elements such as bullets, logos, etc

Image Text Object = A structure that contains a detected text string per given single frame, as well as possible additional information fields, such as the text string location within the frame (e.g. bounding box), and text attribute data (e.g. color of text, font style etc)

Video Text Object = A structure that contains a detected text string along with associated temporal information representing the track of time (or frame numbers) in which that string exists, as well as augmented additional information fields via merging of information from all the frames in the track.

Figure 8:
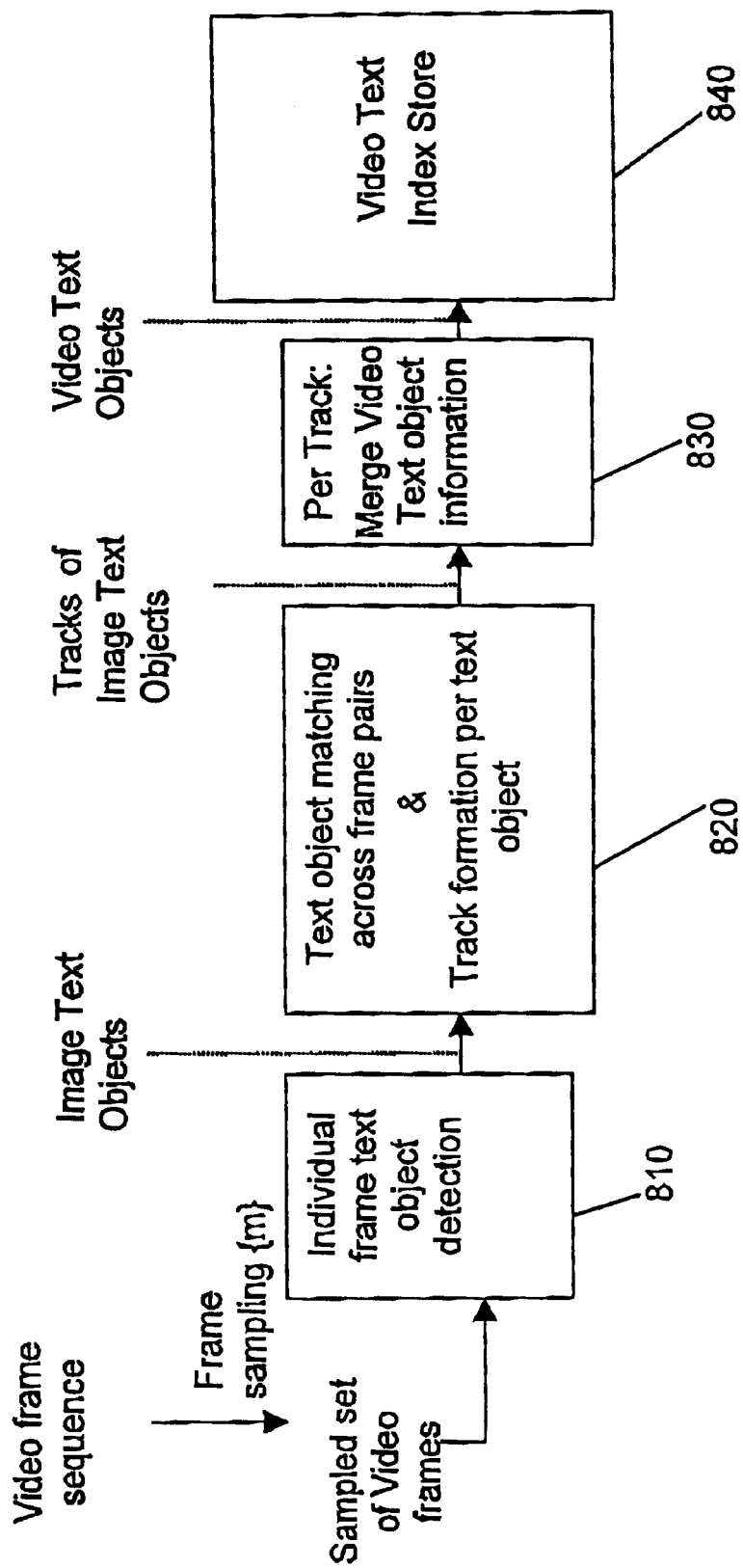
FIG. 8 is a schematic block diagram illustration of the modules of the system of FIG. 5.

An overview of the system modules is shown in FIG. 8, to which reference is now made. Following the individual frame text object detection (810) the set of Image Text Objects is input to multiple frame analysis. The analysis includes text object matching across frame pairs and the extraction of frame tracks per text object (820). The tracks are then input to a module that merges the text object information across all frames in the track (830). The output is input to the Video Text Object store 540.

Figure 9:
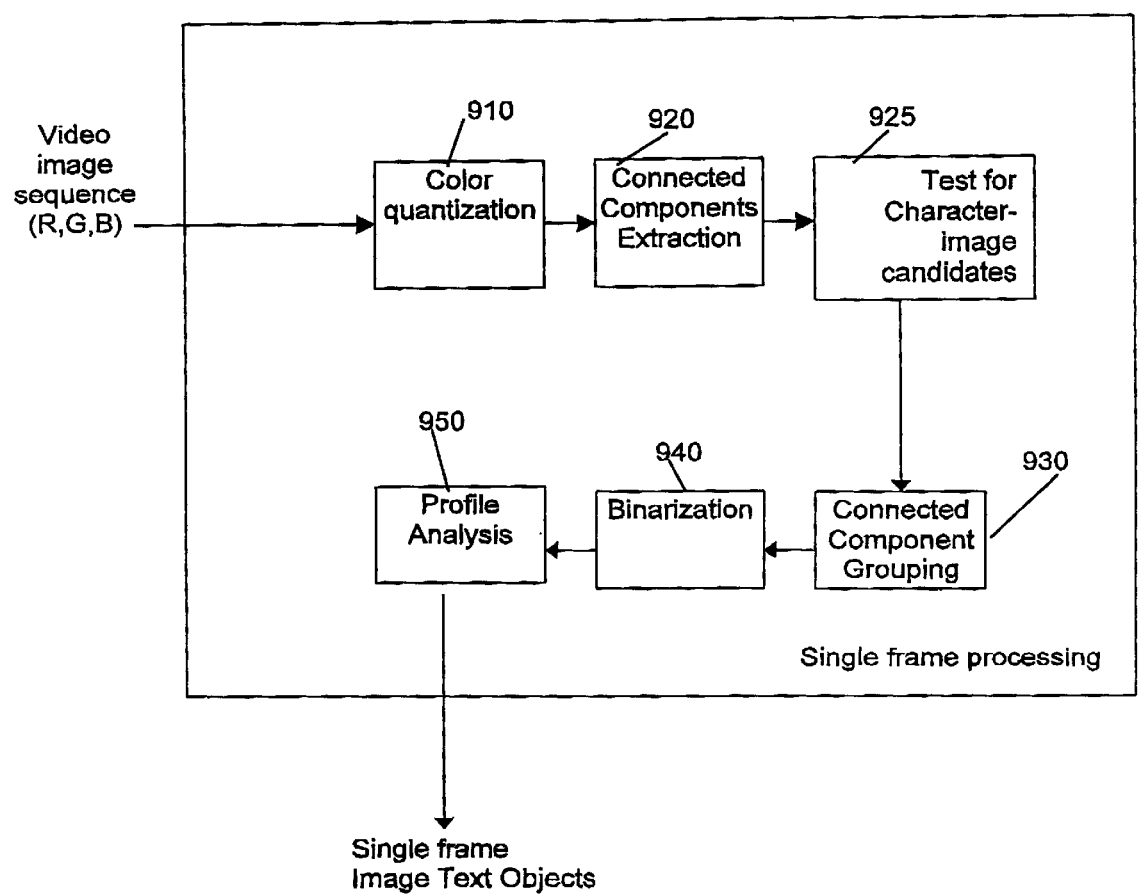
FIG. 9 is a schematic block diagram illustration of the procedure for detection of text in a single video frame.

The procedure for detection of text in a single video frame is outlined in the block diagram illustration of FIG. 9, to which reference is now made. The procedure consists of the following steps:

i. The color space of the video frame (902) is quantized to few colors (typically 4 to 10) (module 910).

ii. For each color index, the connected components of pixels, which map into that color index, are formed (920).

The connected components are tested for being character image candidates. The test consists of dimensions, aspect ration, fill factor for the bounding rectangle (925).

iii. Connected components which have passed the previous test are grouped to test string candidate based on location (930).

iv. For each string obtained as described above, a single text color is assumed. Color analysis is repeated inside the bounding rectangle of the candidate text string. The result of that analysis is a binary image where text pixels are denoted by a True value (940).

v. Following binarization, horizontal and vertical projections of the binary text string images are computed and profile analysis is conducted to verify that the candidate string has indeed text shape characteristics (950).

The output of the localization procedure for text in a given input frame is a set of Image Text Objects (904).

Figure 10:
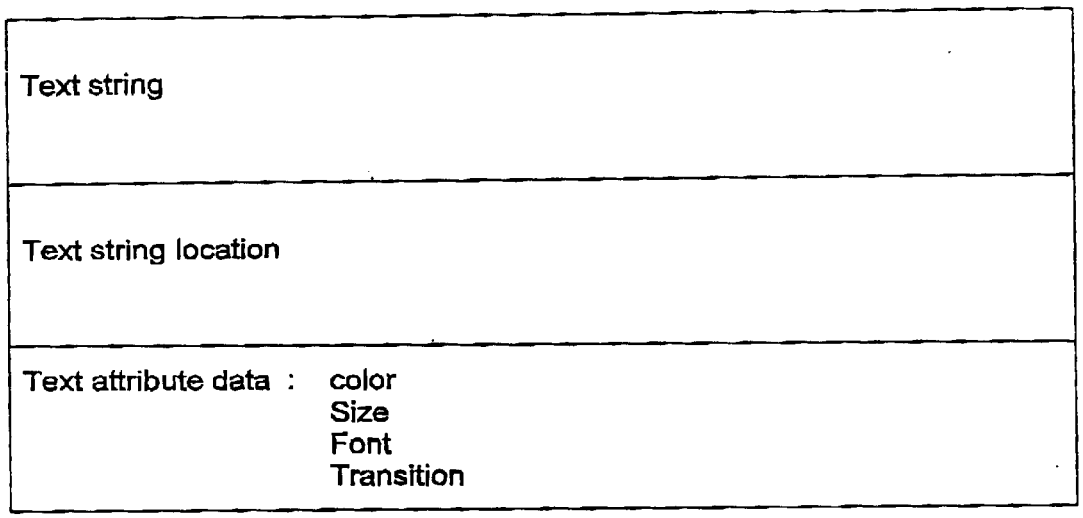
FIG. 10 is a schematic illustration of the data structure for an Image Text Object.

The data structure for the Image Text Object (904) is shown in FIG. 10, to which reference is now made. The Image Text Object 904 is a reduced version of the structure of the Video Text Object 506.

Following the single frame processing module of the system, multiple frame analysis is pursued to shift from the Image Text Object set to the desired Video Text Object set. The multiple frame analysis process includes text object matching across frame pairs and the extraction of frame tracks per text object.

The purpose of the text matching stage is to match Image Text Objects 506 between frames. Generally, video text processing is done every M frames where M is selected based on the following criteria:

the shortest-duration expected for text object;
the greatest text image velocity anticipated; and
the number of samples required for robust recognition of a text string These criteria determine an upper bound on the value of M, where the lower bound is determined by computational considerations. Typically, M ranges from 1 (consecutive frames) to 25 (every second).

Figure 11:
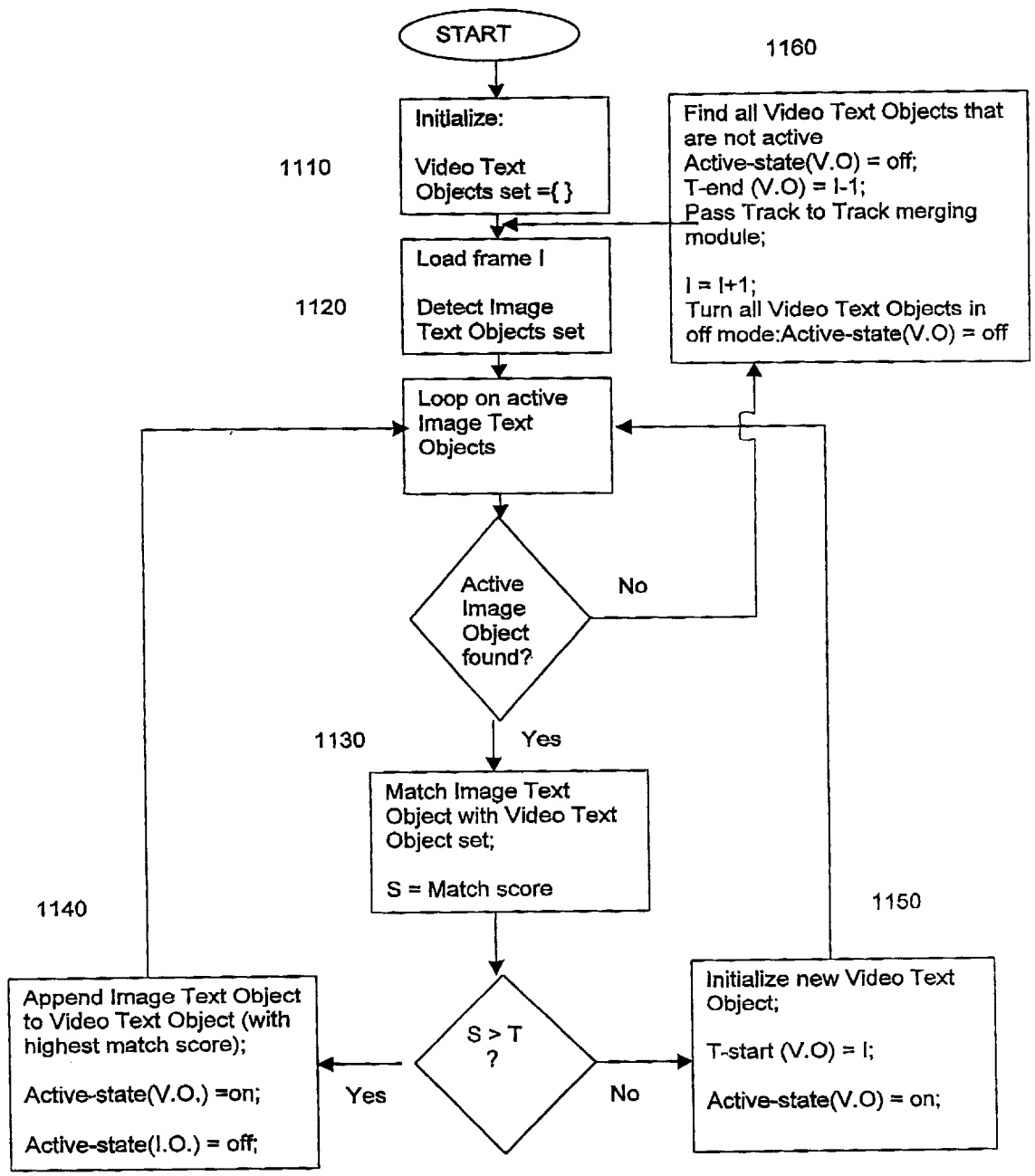
FIG. 11 is a detailed schematic flow chart illustration of the multiple frame analysis of the system of FIG. 5.

The Image Text Object 904 matching and track formation per object is shown in greater detail in FIG. 11, to which reference is now made. The text matching process handles two frames at a time—the current frame and the previous frame. For every two frames, the process repeatedly selects an Image Text Object from the current frame and tries to match it with all available Text Objects from the previous frame. Usually, the text object-matching scenario is simple enough so that the approach, described by the algorithm of FIG. 12 may be adopted.

Sorting Image Text Objects by string length, in each frame, is optionally carried out to prevent cases where a very short string matches a sub-string of the incorrect Text Object.

In choosing the most similar image text object, simple attributes such as text color, text font and text size (which may vary with time) can be used. However, in a typical application, the characteristic data can be shared by multiple image text objects. Therefore, a key factor in text object similarity is string similarity.

Matching strings of text or other symbolic information is known in prior art. To match a finite string A of symbols with another string of symbols B, means to transform or edit the symbols in A into those in B with a minimum-cost sequence of allowable edit operations. The latter include replacing one symbol with another, inserting a symbol into a string and deleting a symbol from a string.

An edit sequence is a sequence of ordered edit operations as above. Associate a cost function with each edit operations, then the edit distance between two strings A and B is the minimum of the costs of all edit sequences taking A to B. This can be carried out by an algorithm with complexity proportional to the product of the string lengths. Given two strings, A and B of length m and n, respectively, the edit distance can be deter-mined in mn steps, as is known in the prior art.

For a static text overlay, it is a straightforward matter to choose the corresponding string and then derive the edit distance as described above. For a moving text the start and end symbol of a candidate corresponding string are not known in advance. Due to the generally small number of characters, it is possible to search also on the start and end symbol. To further reduce computation time one may require at list one symbol identity between the strings.

The time process of repeated text detection and text object matching produces tracks of text objects. Each newly detected Image Text Object initializes a track. Each initialized Object track is associated with a newly defined Video Text Object. The track is initialized at the initial detection frame and is terminated once the Video Text Object cannot be matched by any current frame image Text Objects. This definition lends itself to the following time process as described below, with reference to the flow chart of FIG. 11.

The list of Video Text Objects is Initialized to an empty list (step 1110).

For each frame:
the Image Text Objects are detected (step 1120).
For every Image Text Object:
the Image Text Object is matched with the list of video text objects (step 1130); and
The Image text object is appended to the corresponding video text object (if found) (step 1140).
Every video text object that has not been appended to, is terminated and passed to the track merging process (step 1160).
Every unmatched image text object, a video text object of track length 1 is initialized (step 1150).
After the final frame, all active video text objects are terminated and passed to the track merging process (step 1160).

When a track is terminated, the track is merged into a Video Text Object. This object is characterized as follows:
Start and end frame numbers (or time-codes) as determined by the track formation process.

Text image attributes such as color, size and font.
Track trajectory data: as a list of image coordinates for each frame in the track. Generally video text appears in a fixed position or exhibits simple motion (such as scrolling). These cases can be readily identified and the trajectory put in a symbolic form. In other case the trajectory can be kept explicitly as said list of coordinates.

Video object text data.

Obtaining a more accurate video object text data as compared to a single image object text data is one of features of the present invention. This is made possible by the redundancy of text data in the video text object.

The accurate representation is obtained by string data merging: all strings are brought into alignment (by the string-matching algorithm described above), and majority voting is applied to all characters related to a specific position.

Alternatively, one may use the string matching process only to build the video text objects from Individual video image objects and maintain all text data from individual frames.

The algorithm described so far is generic in the sense that is equally treats overlay text and in-scene text. However, sometimes it is useful to classify video image text as belonging to one of these categories. For example, one may want to search for certain names in signs.

Some of the classification can occur in image space. While in-scene text can be lightly slanted due to perspective, graphics overly, static or scrolling is almost always aligned with image coordinates axes, However, in-scene text can appear as aligned while for some artistic reasons, graphic overlay can be superimposed in a slanted manner. In the present invention, motion properties of in-text are utilized as opposed to superimposed text to make the classification.

The process of deciding a video text object to be of in-scene or overlay nature is described in FIG. 14. Most frequently in-scene text resides on a background object. As such, it moves in accordance to other background features. By computing the dominant motions in the image in regions that do not contain text, the motion of the video text object can be matched with each dominant motion computed. The video text object is associated with the most similar dominant motion (selected by comparing the vector distance of the respective motion vectors), providing that the similarity is large enough, and classified as in-scene text.

Figure 13:
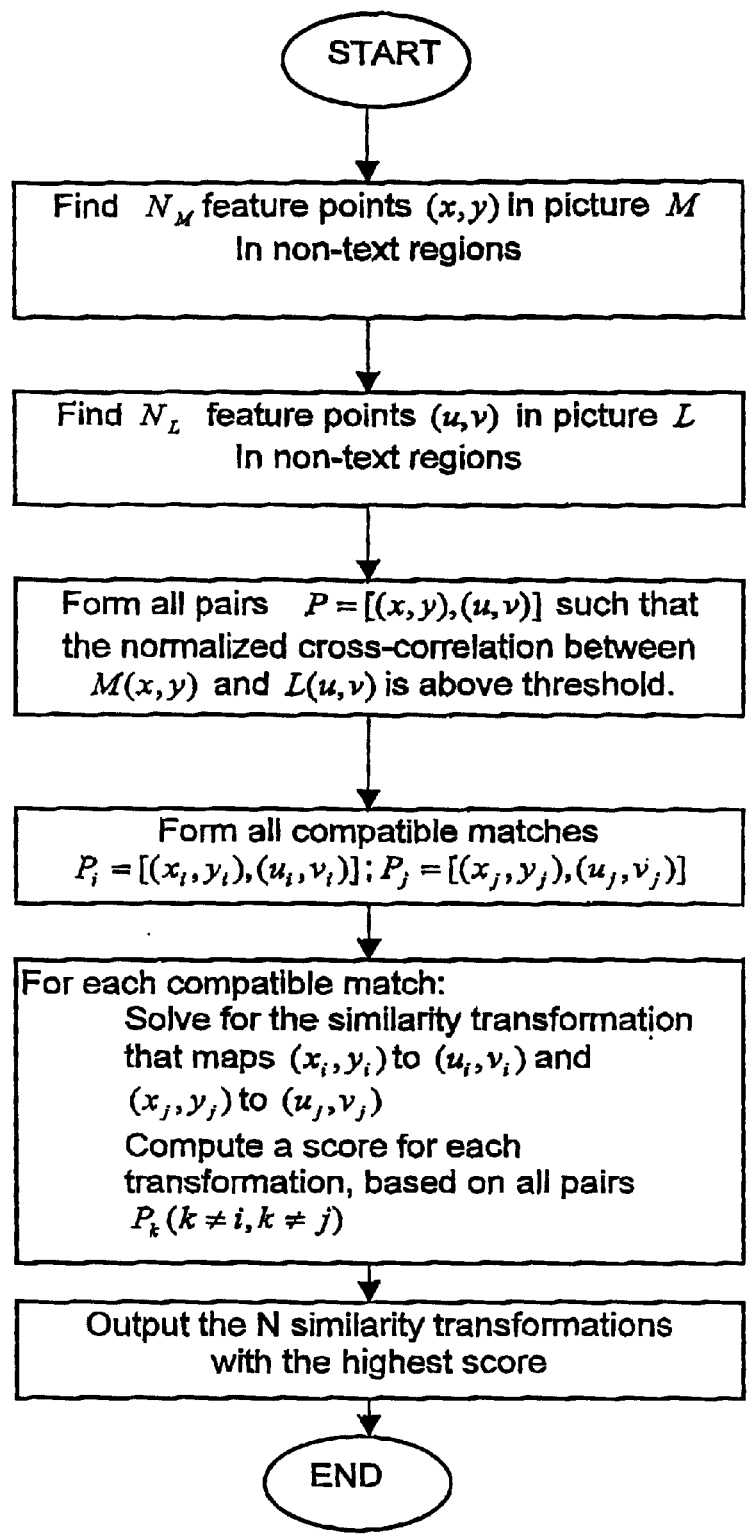
FIG. 13 is a flow chart illustration of the method for the text object matching.

Image motion estimation and motion clustering into dominant motions is is known in prior art. For example, the flow chart of FIG. 13 illustrates how to compute N dominant motions. Given two adjacent video frames, M and L, for which video text objects have been extracted, feature points (that is points that can be localized with high precision, such as corner points) are extracted from both images. The motion estimation is based on pairs of points, thus enabling the measurement of a similarity transformation (shift, scale and rotation) which is general enough to describe motion between adjacent frames. There exist many pairs of points with high image correlation values. However, for real motions (represented by correct matching of point pairs), many other point pairs "agree" with the transformation implied by the matching.

A feature of the present invention is the teaching of searching for text information in video. In the case that the text information of the video text object has been merged into a unified text description data, the searching of text from a user query is carried out against that description. The method used to compare the query with the video object text data is approximate string searching as known in the prior art.

For the case that the text data from individual image text objects, all belonging to the video object being queried are maintained separately, the query is compared with the individual text data. A match is declared in the case that at least one of the text data matches the query text approximately enough. The present invention also teaches an improved strategy in which the matching score is accumulated from individual scores of the text data. This strategy is described in FIG. 15, which is a schematic illustration of the method of using motion information for text categorization.

Figure 16:
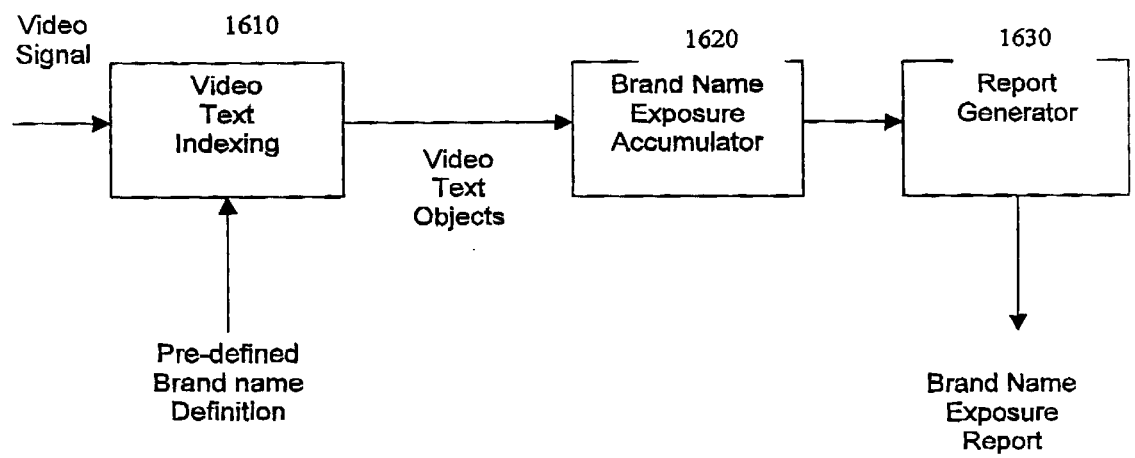
FIG. 16 is a schematic Illustration of a system for brand name exposure monitoring, using video text objects.

As described above the present invention teaches how to search for specific words and strings depicted as images of text in video. The present invention shows how to measure the essential parameters of visual exposure of a textual representation of a brand name in television programming. FIG. 16 illustrates a brand name exposure metering method based on the indexing of images of text in video as described in the present invention.

The video signal 1602 enters a video text indexing apparatus 1610 (similar to 510 as described with reference to FIG. 5 hereinabove). The video text indexing apparatus 1610 produces for each of a subset of the video frames a list of video text objects 1604.

Optionally, the brand name of interest is known to the video text indexing apparatus 1610 and is used in the indexing process to ignore image text objects that cannot be a part of the brand names of interest. The decision to ignore is based on image text objects attributes such as color and font.

Figure 17:
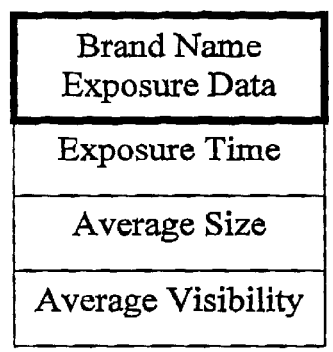
FIG. 17 is a schematic illustration of the data structure for management of brand name exposure of FIG. 16.

The video text objects 1604 enter a brand name exposure accumulator device 1620 (illustrated by the schematic illustration of FIG. 18). The process operates on brand name exposure record (an example of which is depicted in FIG. 17), which includes exposure time, average size, average visibility.

A brand name report can then be generated via the report generator (1630).

It will further appreciated by persons skilled in the art that invention is not limited by what has been particular shown and described hereinabove. Rather the scope of the present invention is defined only by the claims, which follow.

What is claimed is:

1. A method of generating an index of the text of a video image sequence, the method comprising the steps of:
   determining the image text objects in each of a plurality of frames of the video image sequence;
   comparing the image text objects in each of said plurality of frames of the video image sequence to obtain a record of frame sequences having matching image text objects;
   extracting the content for each of said similar image text objects in text string format;
   storing the text string for each image text object as a video text object in a retrievable medium; and
   categorizing the text string as at least one of a group including static text, scrolling text, overlayed text and in-scene text, wherein said step of categorizing comprises the steps of:
   tracking the text string motion, or lack of it, over time;
   tracking the image background motion or lack of it, over time; and
   comparing the text string motion and the background motion.

2. A method of generating an index of the text of a video image sequence, the method comprising the steps of:
   determining the image text objects in each of a plurality of frames of the video image sequence;
   comparing the image text objects in each of said plurality of frames of the video image sequence to obtain a record of frame sequences having matching image text objects;

extracting the content for each of said similar image text objects in text string format;

storing the text string for each image text object as a video text object in a retrievable medium; and storing the frame location of said text string for each image text object as a video text object in a retrievable medium.

3. A method of generating an index of the text of a video image sequence, the method comprising the steps of:

determining the image text objects in each of a plurality of frames of the video image sequence;

comparing the image text objects in each of said plurality of frames of the video image sequence to obtain a record of frame sequences having matching image text objects;

extracting the content for each of said similar image text objects in text string format; and storing the text string for each image text object as a video text object in a retrievable medium, wherein said step of determining the image text objects comprises the steps of:

a) selecting a consecutive pair of frames consisting of a first current frame and its previous frame;

b) selecting an image text object in said current frame;

c) comparing the selected image text object with each image text object of said previous frame;

d) repeating steps b) and c) for each image text object in said current frame;

e) selecting a subsequent consecutive pair of frames consisting of a second current frame and the previous frame of said second current frame, wherein said previous frame of said second current frame is the first current frame; and f) repeating steps b)–e) for each consecutive pair of frames of a video sequence.

4. The method of claim 3, wherein said step of determining further comprises the steps of:

quantizing the color space of each of said plurality of frames to a pre-determined number of individual colors;

forming a map of connected pixels for each of said pre-determined number of individual colors;

determining which of said connected pixels are potentially alpha-numeric characters;

grouping the potentially alpha-numeric characters as potential text string candidates, each of said potential text strings having a single text color;

forming a binary image of said potential text strings; and computing horizontal and vertical projections of the binary image and conducting a profile analysis to whether the potential string has text shape characteristics 5. The method of claim 4, wherein said step of determining which of said connected pixels are potentially alpha-numeric characters comprises the steps of:

determining the dimensions, aspect ratio and fill factor for the color space.

6. The method of claim 4, wherein said step of grouping comprises the steps of:

grouping according to the location of said potentially alpha-numeric characters.

7. The method of claim 3, wherein said step of comparing the selected image text object comprises the step of:

comparing the text content of said text objects.

8. The method of claim 3, wherein said step of comparing the selected image text object comprises the step of:

comparing the location of said text objects.

9. The method of claim 3, wherein said step of comparing the selected image text object comprises the step of:

computing a score characteristic of the image similarity of the regions occupied by said text objects.

* * * * *